March 5, 1968 R. E. WEBER 3,372,050
PAPER COATING COMPOSITION AND METHOD OF COATING
Filed Feb. 7, 1966 2 Sheets-Sheet 2

3,372,050
PAPER COATING COMPOSITION AND
METHOD OF COATING
Robert E. Weber, 518 Hayleh St.,
Neenah, Wis. 54956
Continuation-in-part of application Ser. No. 254,965,
Jan. 30, 1963. This application Feb. 7, 1966, Ser.
No. 525,762
8 Claims. (Cl. 117—64)

ABSTRACT OF THE DISCLOSURE

Stable printing paper coating compositions and a process of coating paper with the compositions; the compositions are aqueous emulsions characterized by starch as constituting the only essential binder of the paper coating composition. The starch is in the aqueous phase and the emulsion contains an oil of lower vapor pressure than water in the disperse phase as well as an emulsifying agent which is of a molecular structure to inhibit the formation of a channel complex which would adversely affect starch binding strength. In the practice of the process the composition is heated on the paper and successive volatilization of water and oil result in a cellular coating. The cellular structure is produced rapidly and accepts supercalendering action without collapse. The coated paper product has an excellent pick resistance and is suitable for letterpress printing.

---

This application is a continuation-in-part of my copending application Ser. No. 254,965, filed Jan. 30, 1963, now abandoned.

This invention relates to a novel product comprising a printing paper having a coating of cellular structure embodied in a starch binder-pigment combination; to a process of producing said product; and to a coating composition in emulsion form for effecting the process.

The economical production of a low basis coated paper for the printing of books, magazines and publications generally is a much desired objective. However, material costs and procedural steps such as adequately drying the wet coated paper web have hitherto prevented the attainment of a product which could be satisfactorily produced commercially.

Briefly and very generally, the procedure of invention involves the preparation of an oil-in-water emulsion containing pigment and starch in an aqueous phase and an oil of lower vapor pressure than water as the disperse phase. This emulsion is applied to a web which is then dried in such manner that the principal portion of water evaporates first and the evaporation of the oil of the discontinuous phase evaporates thereafter leaving minute cells in the coating. The coated web is then lightly supercalendered to develop desirable gloss characteristics in the coated surface. The minute cells serve to opacify the coating by dispersing visible light.

A primary object of the present invention is the provision of a novel process for the production of a coated printing paper product having light basis weight, high opacity and brightness relative to its basis weight and which may have excellent coating pick resistance for letterpress printing operations.

An important object of the present invention is to provide a novel printing paper coating composition in the form of a pigmented oil-in-water emulsion containing starch as the principal or only binder component.

Another object of the invention is to provide a novel process for the production of coated paper webs of light basis weight having a cellular coating containing starch as the only essential binder component and which process is operable at papermaking speeds.

I have found that a system employing starch in relatively large proportion as a binder constituent in an oil-in-water emulsion coating composition is deficient for printing paper purposes and of relatively poor quality unless the composition contains pigment and the starch and emulsifying agent are of a particular character. This latter requirement I consider to be due to the fact that starch tends to interact with emulsifying agents of straight chain structure such as soap, oleic acid, and the like to form a channel complex; this channel complex, it has been discovered, not only tends to destroy the emulsion by the takeup of the emulsifying agent but the complex itself has little binding strength. Accordingly, in the coated paper product of the cellular type, the binder complex does not suitably retain pigment particles on the web or adhere pigment particles to themselves. Emulsifying agents such as soluble salts of oleic or stearic acid may be made to serve the purpose of simply forming an oil-in-water emulsion with starch in the water phase if they are employed in considerable excess but the required adhesive strength characteristic is not even then achieved. Accordingly, a coated printing paper having a coating of cellular structure in which starch is the only binder component or the only essential binder component has not been previously successfully produced.

The foregoing difficulties, utilizing the starches described hereinafter, may be overcome and excellent adhesion and coating pick resistance attained if the emulsifying agent is selected to have a "blocking" group; the presence of such group, I have found, serves to inhibit the formation of a complex between the starch and emulsifying agent. That is, the starch is, in effect, in an "unblocked" condition in the composition and final coated product. When unblocked, the starch is free to accomplish its intended function—and a minimum of the emulsifying agent is required. The emulsifying agents found to be most suitable have the general formula

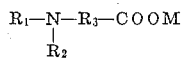

wherein the —COOM group is the hydrophilic portion of the molecule and the remainder is hydrophobic. Preferably, $R_1$ is a substituent selected from the group consisting of an alkyl radical of about 10 to 18 carbon atoms or an aliphatic radical attached to an aryl which is attached to the nitrogen atom (N), or $R_1$ is an alkyl substituent which is attached to the N atom and which N atom forms part of a heterocyclic ring system; $R_2$ is a substituent selected from the group of lower alkyls (1 to 8 carbon atoms) and substituted lower alkyls and is considered the blocking group; $R_3$ is an alkyl or aryl group usually of 2 to 6 carbon atoms and terminated by the ionizable hydrophilic group; and N is a nitrogen atom. Such compounds are commercially available and have been found preferable but equivalents thereof containing a blocking group and having a branching atom other than nitrogen, such as phosphorus, silicon, or carbon atoms, may be employed. For example, compounds having the carbon branching atom include:

Sodium 4-n-propyl palmitate,
Sodium 3-n-propyl 4 ethyl myristate,
Sodium 3,5-n-propyl hexadecane sulfonate,
Di-ammonium 1,1-di-ethyl sulfonate dodecane.

In essence, the emulsifying agents found most useful are those having the usual hydrophobic terminal grouping, the usual hydrophilic terminal grouping, and a branch chain of materially lesser length than the hydrophobic terminal grouping. The use of such emulsifying agent provides the starch "unblocked" by the emulsifying agent and is a primary feature of the cellular coatings of the invention. The term "unblocked" as used herein and in the appended claims will be understood to mean such a condition of the starch.

The starch product employed as the binder should have a reduced gelling tendency. By this I mean that the starch should be essentially nongelling or should provide a soft gel structure having a degree of mobility and low yield value. This is necessary to attain the desired creamy white coating emulsion which breaks during the drying step to provide the appropriate cell structure of the product. Starch materials which serve the purpose include hydroxyethylated starches, acetate starches, root starches such as tapioca starch, oxidized starches and the like, as well be noted more particularly hereinafter. The starch products which are not suitable for the practice of the invention are those which set to a hard gel or gel of intermediate hardness; emulsions formed with hard gelling starches tend to break too soon—before application to the web, while the starches which I characterize as of intermediate hardless break when applied to the web, separating into two phases before drying occurs. Raw cornstarch, for example, is unsuitable as the starch material because it sets to a hard gel. The terms "modified" and "mobile" as employed herein designate the useful starch materials. The term "modified" is intended to include the chemically modified starches of commerce such as those mentioned above. The term "mobile" is intended to include the modified starches as well as root starches as mentioned above. The terms "essentially nongelling" and "substantially nongelling" are intended to include the starches characterized as "modified" and "mobile."

These starches are in themselves well known to the paper coating art. The invention is characterized by the findings that such starches, when properly emulsified and dried as coatings under determined conditions, retain sufficient strength in cellular coating form to resist printing pressures and to even exhibit utility for letterpress printing where excellent pick resistance is an important factor.

I have further found that a pigment content is desired in my coating composition, as such aids the rheological properties of the emulsion, tends to aid the drying of the composition by interrupting the binder component, thereby providing some degree of porosity in the coating, which apparently aids water escape, and especially, apparently stabilizes the emulsion during the drying stage. Also, the presence of the pigment adds bulk to the coating.

The drying of the coating composition on the paper web to which the composition is applied is an important factor in the attainment of useful coated surfaces. In the drying operation the temperature and the nature of the emulsion must be such that the water content of the emulsion is essentially first evaporated; the oil of the dispersed phase, which oil is suitably a hydrocarbon such as a petroleum distillate having a lower vapor pressure than the liquid of the continuous phase at the drying temperature, is flashed off secondly to provide in the coating a multiplicity of cells; these cells contribute to the ultimate opacity of the coating. Accordingly, the temperature to which the fluid composition is subjected must not be so high that the oil and water flash off together—such leads to poor cell structure, microscopic blisters in the coating, and poor coating pick resistance. Also, the drying temperature must clearly be below that at which the coating tends to scorch or burn. Conversely, the temperature conditions should be sufficiently high that drying may be effected at papermaking machine speeds. I have found that the drying temperatures vary somewhat with the specific nature of the drying equipment. Thus, drying is effected more readily by a high velocity air blast than with the usual drying drums. At a speed of about 1500 f.p.m., the coating may be adequately dried within one second at temperatures of 200 to 350° F. utilizing an air blast directed onto the traveling web; such drying temperature, of course, also varies with the specific nature of the oil phase, since the oil must be flashed off and flashed off after substantially all of the water is eliminated. The drying time may be as much as a few seconds when the pigment to starch ratio by weight is low. The emulsifying agent, in addition to its other requirements, must remain stable under the drying temperature conditions employed and is a constituents of the final coating.

The pigment to starch ratio by weight which is preferred for letterpress printing papers is about 1:1 and should not exceed about 1.25:1 as, under this latter condition, the coating pick resistance tends to decrease. The minimum pigment to starch ratio is suitably about 1:4 by weight. While less pigment may be utilized, the emulsion becomes less stable as pigment is decreased and an all starch emulsion which contains no pigment tends to break down in the drying stage of the procedure. The pigment itself may be any of the usual paper coating pigments such as clay, calcium carbonate, titanium dioxide, and the like; however, clay is preferred for, while pigments such as titanium dioxide are technically feasible, they are considerably more expensive. However, such pigments have been employed in the same set proportions as given above.

The preferred starch to oil ratio by weight is about 1:1.56 for letterpress printing papers. In general, with low pigment content relative to the starch, I may increase the oil content to provide for an improved finished coating—an excessive oil content, however, tends to inhibit drying of the composition. A suitable weight ratio of starch to oil is 1:2.25 when the pigment to starch ratio in parts by weight is 1:4. Conversely, when the pigment is present in relatively large proportion to the starch, that is, about 1.25:1, then the starch to oil ratio may be 1:1.4 in parts by weight. Accordingly, for each part by weight of starch coating composition suitable for even heat-set letterpress printing may be prepared with pigment contents which vary from about 0.25 to 1.25 parts and the oil content may vary from 2.25 parts to about 1.4 parts. These foregoing weight data are based on oil having a specific gravity of about 0.78.

The emulsion itself, for application to a web by trailing blade or rod coating equipment, should have a viscosity in the range of about 5,000 to 18,000 centipoises as measured with a Brookfield viscometer at 100 r.p.m. with a #6 or #7 spindle at 40° C. The nature of the coating device influences the optimum viscosity range to some extent; also, the coating composition must not be so low in viscosity that it bleeds into the web materially as such results in poor optical properties in the product. On the other hand, high viscosity generally causes poor coating lay on the web. Most suitably, the viscosity range is 10,000 to 12,500 centipoises for coating machine operation.

The viscosity is materially influenced by the solids content of the composition and the starch material. The starch, which is essentially inert chemically relative to the emulsifying agent, must impart to the composition a viscosity characteristic such that the composition is readily applied to the base sheet; the viscosity may be changed, of course, by the quantity of water in the aqueous phase. I have found that a solids content of the complete composition of between about 25 and 40% by weight is attainable and that optimum rheological conditions for coating by trailing blade or trailing rod are achieved in the solids range of 30–33% by weight. Particularly when the pigment employed is calcium carbonate, solids of up to 40% are satisfactory for coating purposes.

The dried uncalendered web has a relatively dull surface. This is improved as to gloss by light supercalendering. I have found that the web should be quite dry when supercalendered. A moisture content of less than 5% of the weight of the coated web is desired and preferably the moisture content should be 2–3% of the web weight. Below about 1% the web is too dry and does not respond as well to the supercalendering action. At the higher moisture contents above 5%, the cell structure is affected adversely and is in general broken up, resulting in loss of opacity and gloss. The term "light"

supercalendering will be understood to mean only that amount of pressure necessary to develop the desired gloss; such supercalendering treatment, as described, I consider necessary to procure adequate gloss surface for quality letterpress printing.

The oil component should be one which is not miscible with water and should have a low volatility relative to water to insure that the evaporation of water from the coated web essentially precedes the oil evaporation. Oils such as the hydrocarbons and hydrocarbon mixtures, kerosene, No. 1 and No. 2 fuel oils, Stoddard's solvent, and the like are suitable. The preferred oils should leave no odorous or discoloring residues and should be such that it is completely driven off in the drying stage. Also, the preferred oils are those which may be completely driven off from the coated web at temperatures at which the coated web is not deleteriously affected by the heat.

I have further found that the brightness of the pigment-starch coatings may be improved by employing a very small quantity of protein—not more than about 10% by weight of the binder weight—in the composition. The protein must be limited for it has a tendency to inhibit the development of optimum bonding of the coating to the base sheet. In such instance it is necessary to solubilize the protein, and this is readily effected with the inclusion of a quantity of a concentrated ammonium hydroxide. However, high shear as in a Kady mill or the Epponbach emulsifier is desirable in the formation of the emulsion. While high shear aids the formation of emulsions containing only starch as the binder, it is not as beneficial as when protein is included, though high shear will raise the brightness and opacity of the supercalendered starch product by about 2 points. However, the mere substitution of protein for starch to the extent of 2.5 to 10% by weight is effective to increase the G.E. brightness of a coating about 4 to 5 points. G.E. brightness is the value obtained by measurement by means of a G.E. reflection meter by standard procedure.

The invention will be more fully understood by reference to the following detailed examples and accompanying flow charts wherein.

EXAMPLE I

Figure 1:
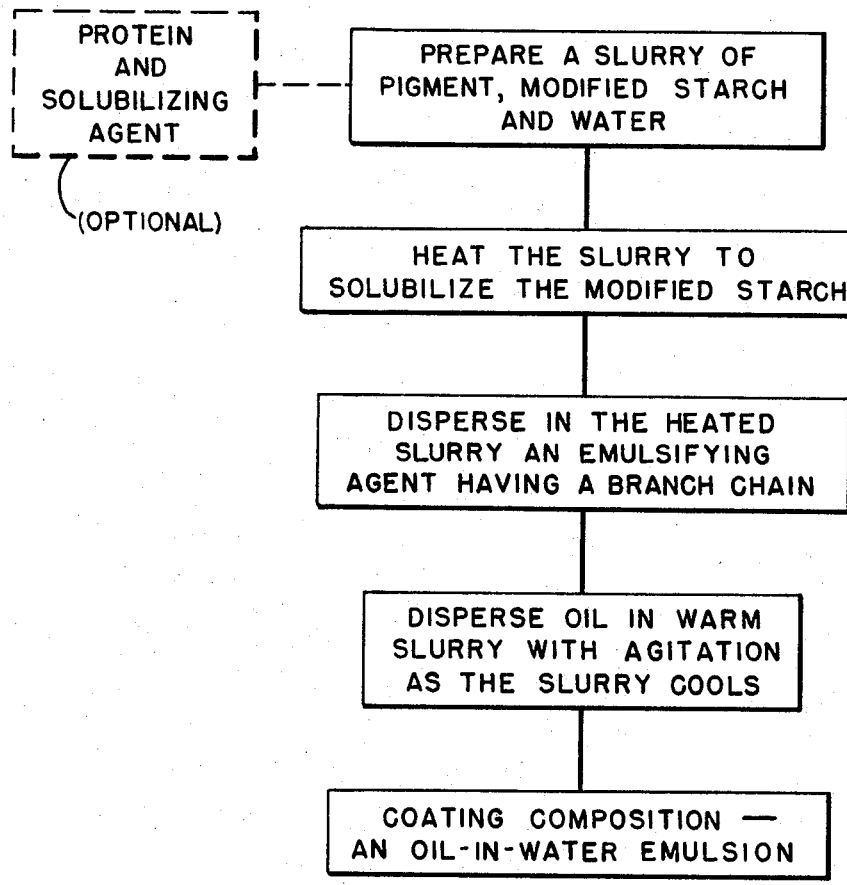
FIG. 1 illustrates the steps of emulsion formation in a preferred embodiment of the invention.
Figure 2:
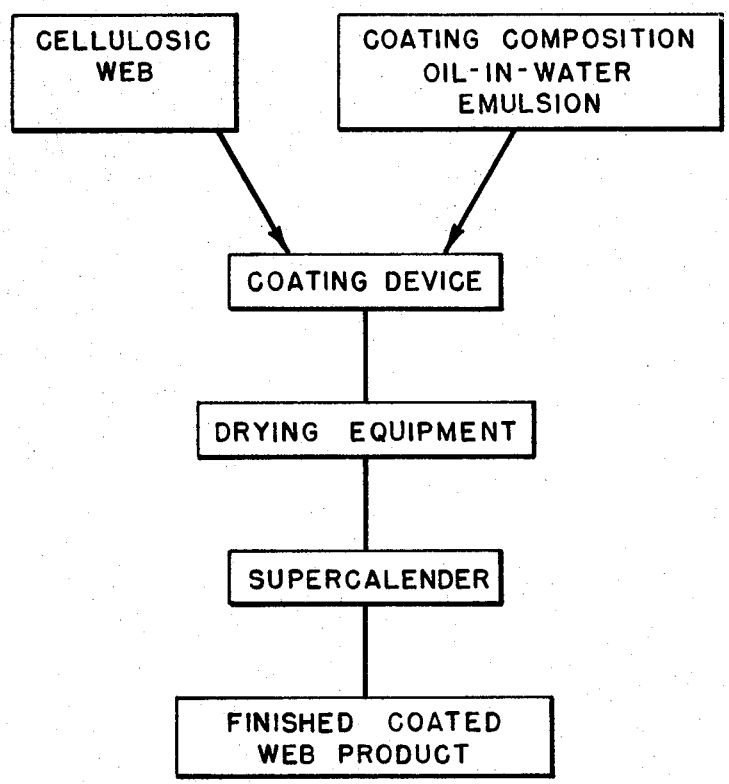
FIG. 2 illustrates the steps of coated web production.

In a stainless steel 1500 millimeter beaker 250 grams of Ethylex Gum 2030, a hydroxyethylated starch, a product of A. E. Stanley Manufacturing Company, Decatur, Ill., and 250 grams of Spray Satin clay, together with 680 grams of water, were first slurried; the slurry was then cooked on a hot water bath at 95° C. for about 15 minutes; this heating dissolved the hydroxyethylated starch. An emulsifier, a flaky solid having the following formula $CH_3(CH_2)_{11}-N-(CH_2CH_2COONa)_2$ disodium N-lauryl-β-iminodipropionate was added to the extent of 10 grams while the suspension was maintained at a temperature of 95° C. The emulsifier dissolved in approximately 5 minutes. Oil was added to the aqueous mixture while the suspension was at a temperature of 90° C. This oil was Stoddard's solvent to the amount of 500 milliliters or 390 grams. The mixture was then stirred vigorously at low shear forces with a Lightnin mixer for 45 minutes while cooling to a temperature of 40° C. to form a creamy white fine particle emulsion. The oil particles are about ½ to 2 microns primarily and of a size such that visible light will be scattered from cell walls formed by the breaking of the emulsion. The cell size of about ½ to 2 microns is determined by photographing a film of the emulsion on a glass plate at a magnification of 1600 X and measuring the cell diameter. The composition at the temperature of 40° C. had a viscosity of 11,000 centipoises as measured with a Brookfield viscometer running at 100 r.p.m. with a #7 spindle. The pH of the coating composition was 9.3.

This coating composition, at a temperature of 40° C., was applied to a 27-pound basis weight uncoated bookpaper containing 40% Kraft pulp and 60% groundwood. A 4½" wide trailing blade laboratory coater was employed, and the coating was immediately dried with high velocity hot air, the emulsion breaking as the water is substantially completely evaporated; the temperature of the air was 150° C. and the air pressure equal to 16" of water. The air was impinged vertically upon the sheet, and the sheet itself was substantially unbacked. The sheet required, under these conditions, less than 2 seconds to dry substantially free of water and oil. The second side was similarly coated and dried. The amount of coating applied (dry basis) was 3 pounds per side. The coated web, when merely dried, is somewhat rough and relatively dull; the web, dried to a moisture content of 2–3%, was supercalendered under moderate to light pressure resulting in a material smoothing and the development of gloss in the sheet. Such supercalendering did not destroy the cells created by the effusion of the oil during drying; the gloss increase, due to the light supercalendering, is about the same increase as is conventionally attained in the supercalendering of normal coated webs. The resultant coated supercalendered web exhibited a Bausch & Lomb opacity of 90–91. This is in contarast to the uncoated sheet which had a Bausch and Lomb opacity of about 85. The G.E. brightness of the supercalendered coated web was about 71, as compared to the base sheet brightness uncoated of 67.

The coating pick results were excellent, exhibiting a value of 1 as measured by a standard letterpress pick test. These letterpress pick test results are graded on a scale of from 1 to 10. Values of 1 are considered excellent for letterpress printing. Values greater than 4 are considered non-acceptable. The test is made by actually applying ink to the coated paper surface with a letterpress plate; subjective evaluation by comparison of samples with a standard is made of the paper surface after printing. The data set forth herein for letterpress pick have been obtained by such testing. Ethylex gums 2020, 2065 5% D.S., and 3065 10% D.S. as binders give similar results.

EXAMPLE II

Example I was repeated but a lauryl cycloimidinium, 1-hydroxy, 3-ethyl sodium alcoholate, 2-methyl sodium carboxylate, was substituted for the emulsifying agent of that example. Such agents has the formula:

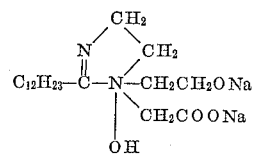

The agent was added as an aqueous solution at about 37% solids. The solution was added in sufficient quantity to provide 10 grams of the emulsifying agent in the system. The viscosity of the coating composition was about the same as in Example I and the coated paper had essentially the same characteristics as in Example I.

EXAMPLE III 10 grams of an emulsifying agent having the formula

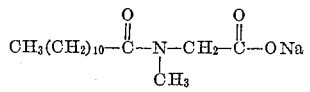

were substituted for the emulsifier of Example I. This emulsifier is added as a white powder to the aqueous phase of the coating before oil addition. The emulsion formed easily and provided a coating having similar properties to those in Example I. The letterpress coating pick values for this coating were also 1.

EXAMPLE IV 10 grams of an emulsifying agent having the formula

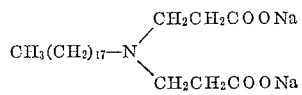

disodium N-tallow-β-iminodipropionate were substituted for the emulsifying agent of Example I; this is a solid and is added in the same manner as the emulsifier of Example I. This emulsion also formed easily but the emulsion thickened to a somewhat greater degree than in Example I; and the coated web showed letterpress coating values of 2 to 3. The difference between this and Example I appears to be that this emulsifying agent has a somewhat longer hydrophobic terminal group and contained 18 carbon atoms compared with 12 in the emulsifier of Example I. The coated web nevertheless was of good commercial quality.

Emulsifiers that formed good emulsions but which exhibited unsatisfactory letterpress pick properties when employed as in Example I are as follows:

Dodecyl benzyl sulfonate (sodium salt)—pick resistance 8,
Sodium oleate—pick resistance of 10,
Sodium stearate—pick resistance of 10.

Such emulsions are required to be added in excess, that is, to the extent of about 2 to 3 times that of emulsifying agents of Examples I to IV inclusive in order to achieve in adequate emulsion for coating the web.

EXAMPLE V

Example I was repeated but modified to provide for the inclusion of a small quantity of protein. Thus, 238 grams of Ethylex Gum 2030 (hydroxyethylated starch), a product of the A. E. Staley Manufacturing Company, 13 grams of soy protein, 3 grams of concentrated ammonium hydroxide solution to solubilize the protein, and 250 grams of Spray Satin clay together with 680 grams of water were dispersed in the form of a slurry. This slurry was heated on a water bath at 95° C. for about 15 minutes to insure of dissolving the starch and solubilizing of the protein; the emulsifier (of Example I) was then added to the extent of 10 grams and dissolved by continued heating at 95° C. for about 5 minutes. The oil (Stoddard's solvent) was added to the extent of 500 milliliters (390 grams).

This dispersion was then emulsified in an Epponbach emulsifier and subjected to vigorous shear for about an hour at about 60° C. The resulting emulsion had a viscosity of 12,500 centiposes as measured with a Brookfield viscometer at 100 r.p.m. with a #7 spindle at 40° C. The pH of this composition was 9.3.

The coating composition, when applied to the extent of 3 pounds per side (dry basis) to a 26 pound basis weight web (25" x 38" x 500 sheets) as described in Example I, dried in less than 2 seconds also. The web supercalendered under light pressure exhibited a value as measured on the G.E. brightness test of 74, about 3 points higher than the product of Example I. The Bausch and Lomb opacity was about 92. The base sheet uncoated of this and Example I had a G.E. brightness of about 67. The coating pick resistance of the product of this example and of Example I were about the same.

EXAMPLE VI

The procedure of Example I was repeated except that acetate modified starch (Kofilm 80, a product of National Starch and Chemical Corporation of New York, N.Y.) was substituted for the hydroxyethylated starch and to the same extent. Equivalent results as to coating pick and brightness were obtained.

EXAMPLE VII

Example I was repeated except that the proportions of the constituents were changed to provide the starch in large proportion by weight relative to the pigment. The composition included:

| | Parts by weight |
|---|---|
| Modified starch | 250 |
| Pigment (Spray Satin clay) | 70 |
| Oil (Stoddard's solvent) | 390 |
| Emulsifying agent (as in Example I) | 10 |
| Water | 680 |

The viscosity of such composition is substantially the same as that of Example I but the product has improved brightness; the brightness may be further improved in such instance by increasing the quantity of oil to about 450 parts and the water content to about 730 parts to maintain viscosity. The dry applied weight of such coating is lower due to the decreased quantity of pigment.

EXAMPLE VIII

Example I was repeated utilizing the following composition;

| | Parts by weight |
|---|---|
| Modified starch | 250 |
| Pigment (Spray Satin clay) | 300 |
| Oil (Stoddard's solvent) | 390 |
| Emulsifying agent (as in Example I) | 10 |
| Water | 680 |

Such coating is useful but the letterpress pick resistance is lower and marginal due to the presence of the relatively large quantity of pigment relative to the oil and starch. While marginal for letterpress printing, the coated web has suitable characteristics for other printing application requiring less pick resistance.

EXAMPLE IX

The procedure of Example I was carried out by utilizing the following emulsion:

| | Parts by weight |
|---|---|
| Modified starch | 1,000 |
| Pigment (Spray Satin clay) | 250 |
| Oil (Stoddard's solvent) | 390 |
| Emulsifying agent (as in Example I) | 10 |
| Water | 3,000 |

The relatively large proportion of starch provides for adequate pick resistance but the brightness and opacity attained are lower since the quantity of oil per pound or the dry coating is less and particularly so relative to the starch. Drying this composition is slowed by the presence of the large amount of starch and water.

EXAMPLE X

Example I was repeated utilizing the following proportions of emulsion components:

| | Parts by weight |
|---|---|
| Modified starch | 300 |
| Pigment (Spray Satin clay) | 250 |
| Oil (kerosene) | 390 |
| Emulsifying agent (as in Example I) | 10 |
| Water | 750 |

The product achieved has essentially the same characteristics as that produced in Example I.

EXAMPLE XI

Example I was repeated using the following formulation and employing a drying temperature of about 175° C. (347° F.).

| | Parts by weight |
|---|---|
| Modified starch | 250 |
| Pigment (Spray Satin clay) | 100 |
| Oil (#1 fuel oil) | 500 |
| Emulsifying agent (as in Example I) | 20 |
| Water | 730 |

In such formulation the brightness and opacity are improved while the pick is entirely satisfactory for letterpress printing. The G.E. brightness is about 74 and the Bausch and Lomb opacity 92. The improvement in brightness and opacity is due to the relatively large quantity of oil which provides for a great multiplicity of cells in the coating structure.

EXAMPLE XII

Example I was repeated but employing only 5 parts by weight of the emulsifying agent instead of 10 parts; this required a blending of the components in an Epponbach emulsifier in order to procure an optimum composition. The results were as in Example I.

In general, I have found that the emulsifying agent may suitably be present to the extent of between about 1 to 4% on the weight of the oil.

EXAMPLE XIII

The following composition incorporates as the mobile starch a substantially nongelling oxidized starch of the National Starch and Chemical Company designated by the trade name Fibersize 95. This starch is hypochlorite oxidized. The formulation is as follows:

| | Parts by weight |
|---|---|
| Spray Satin clay | 200 |
| Modified starch (Fibersize 95) | 200 |
| Oil (kerosene) | 400 |
| Emulsifying agent (as in Example I) | 8 |
| Sodium hexametaphosphate | 0.2 |
| Water | 500 |

The emulsification in this instance differed from that of Example I in that an Epponbach emulsifier was employed and the mixing action was effected therein for about 90 minutes.

Sodium hexametaphosphate also was employed in small quantity to aid dispersion of the clay. Such is not necessary although it may also be employed in any of the preceding compositions in about the same proportion relative to the clay. Spray Satin clay is itself a predispersed clay and, as is well known, frequently contains a small proportion of sodium hexametaphosphate to aid clay dispersion.

The pH of the above emulsion was 8.9 and the viscosity at 40° C., as measured on a Brookfield viscometer at 100 r.p.m. with a #7 spindle, was about 12,000 centipoises.

The coating, when applied to a 26 pound basis weight web, was similar in characteristics particularly as to letterpress pick and brightness to the product of Example I.

EXAMPLE XIV

The emulsion composition of this example is like that of Example I; the example illustrates the utility of the process in large scale operation. The composition was formulated as follows: 135 pounds of predispersed clay (Spray Satin), 135 pounds of hydroxyethylated starch (Ethylex Gum 2030) and 0.14 pound of sodium hexametaphosphate are slurried in 277 pounds of water and then cooked by live steam injection. About 60 pounds of water were added by the cooking procedure. To the hot slurry (95° C.) 5.4 pounds of the emulsifier of Example I was added while mixing with a Lightnin mixer. Stoddard's solvent to the extent of 210 pounds was added and mixing continued for 45 minutes; the emulsion was then passed to a Kady mill, agitated for 4 to 5 minutes, and then pumped to the trough of a coating machine. The specific unit employed was a Beloit type flooded nip coater followed by a reversely rotating Champion rod. Additional batches are similarly formulated and pumped to the machine trough as required.

The composition had a viscosity of 12,000 centipoises as measured with a Brookfield #7 spindle at 40° C.; the total solids was about 32.7%.

The sheet to which this composition was applied was a paper web formed from 40% sulfite pulp and 60% groundwood having a basis weight (25" x 38" x 500 sheets) of about 24 pounds. The sheet passed through the coater equipment at 900 f.p.m.; the wire side of the web was coated first and dried. The drying was effected with a hot air blast (about 300° F. air temperature) directed vertically onto the sheet as the sheet passed over spaced small diameter carrying rolls. Thus, the sheet was largely unbacked during the drying. The dried web was then coated on the felt side with the same composition and was dried in the same manner.

The oil evaporated off in the process, was continually withdrawn under vacuum and burned. Such oil may be condensed and recovered if desired.

The dried coated sheet had a basis weight (25" x 38" x 500 sheets) of 30.4 pounds (about 2–3% moisture).

This coated dried web was then supercalendered at the 2–3% moisture content; the supercalendering is effected on regular production equipment under light pressure.

The opacity of the sheet was 91 (Bausch and Lomb opacimeter); the G.E. brightness 71; and gloss was very good. The letterpress pick value was 2.

EXAMPLE XV

The procedure of Example XIV was repeated except that 5% by weight of soy protein was substituted for 5% of the starch weight. The Bausch and Lomb opacity increased slightly to about 91.5, and the G.E. brightness was about 72.5, while the gloss remained about the same and letterpress pick resistance was 2.

EXAMPLE XVI

A coating composition similar to that of Example V but containing a larger percentage of soy protein was formulated and applied to a paper web. The soy protein content was 10% of the total weight of starch and protein. The composition including:

| | Parts by weight |
|---|---|
| Starch (hydroxyethylated) | 180 |
| Soy protein (low viscosity) | 20 |
| Pigment (Spray Satin clay) | 200 |
| Oil (as in Example I) | 312 |
| Emulsifying agent (as in Example I) | 8 |
| Concentrated ammonium hydroxide | 3 |
| Sodium hexametaphosphate (added as a 50% aqueous solution) | 0.2 |
| Sodium carbonate (added as a 10% aqueous solution) | 5 |
| Water | 625 |

As in Example V the components, including the starch, protein, clay and water were formed into a slurry, heated at 95° C. to assure of solubilizing the protein, and the emulsifier was then added. Upon solution of the emulsifier, the oil was added and emulsification effected in an Epponbach emulsifier. The time of emulsification was about 90 minutes. The emulsifying action took place smoothly, the cell size of the droplets being as in Example I between about ½ to 2 microns. The emulsion had a viscosity of about 13,200 centipoises (Brookfield), a pH of about 9.4 and a solids content of 29.6%.

This coating composition, when applied to a base sheet to the extent of about 3 pounds per side, dried quickly, providing the cells of ½ to 2 microns in the dried composition as in Example V, and, upon supercalendering, exhibited about the same G.E. brightness as did the product of Example V. The Bausch and Lomb opacity was slightly lower, approximately 90 over an average of a series of tests with the same composition. The letterpress pick value, however, was significantly less as the bonding of the composition to the base sheet tended to be decreased. A repeated series of tests indicated that the coated sheet, while capable of exhibiting commercially acceptable letterpress values of 2 and 3, and while useful for other printing applications, was nevertheless more sensitive to rupture than coatings containing a lesser amount of protein. Consequently, I prefer to maintain the protein content somewhat lower and the starch content at 90% or more of the total binder weight.

Figure 3:
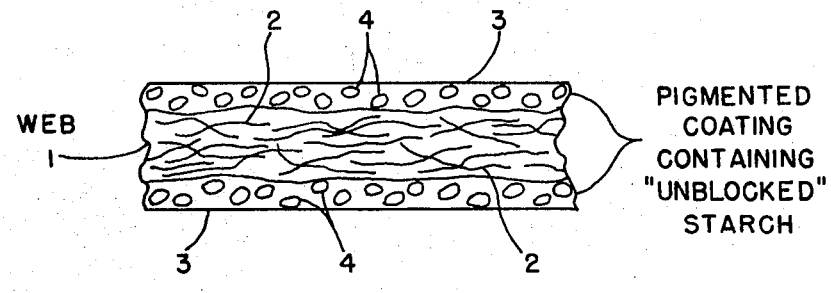
FIG. 3 is a schematic fragmentary and enlarged view illustrating a coated paper web in accordance with the invention.

In FIG. 1 the preferred steps in emulsion formation are set out, the protein addition being indicated as optional. The composition is applied to the web in the preferred arrangement of steps to form the product illustrated in FIG. 3. In the latter figure the web is designated at 1, the fibrous nature of the web being illustrated broadly by the numeral 2. The coating 3 which is applied to either or both sides of the web contain a multiplicity of cells of about ½ micron to 2 microns as designated at 4.

The foregoing specific examples are entirely reproducible and reproducible with other paper coating pigments to achieve essentially the same results. Also, while I may use as the oil of the disperse phase a material having a boiling point at 760 mm. pressure of 230–350° F., the void or cell structure is improved and drying achieved readily if the boiling point of the disperse phase material is between about 260° and 300° F. and the drying temperature is about 300° F. For example, perchlorethylene having a boiling point of 248° F. gives a relatively poor cell structure. It is to be noted that perchlorethylene has a specific gravity of greater than twice that of the hydrocarbon oils and, accordingly, should be employed at about twice the weight of the hydrocarbons in order to secure the desired oil volumes.

It will be apparent from the foregoing and the many examples that a variety of components may be employed in the production of coatings in accordance with the invention. The component requirements are essentially physical rather than chemical and a large cataloging of useful materials does not appear warranted. For example, the starch product must be nongelling or, if gellable, must be such that in gel form it is much like a soft pudding and will not retain shape under light pressure. Accordingly, I have defined the "mobile" starch material of this invention in the appended claims as "essentially nongelling." Such starches are commercially available as indicated hereinbefore in connection with the specific examples particularly. The viscosity range of the composition is also a physical characteristic which may be varied even by water addition to suit the characteristics of particular coating equipment and the viscosity is determinative to a large degree of the upper allowable limit of paper coating pigment in the emulsion. The emulsifying agent action also is largely physical with relation to the starch as it serves, in addition to its normal function, to block interaction with the starch by the presence of the side chain. Such blocking action is, nevertheless, required to produce the required pick resistance in the coated product for letterpress printing. Also, the starch when unblocked (not complexed with a straight chain emulsifying agent or the like) is useful in rotogravure printing at minimum starch weight requirements. The oil also has a largely physical action in producing the cells, voids, or interfaces between the air and coating material when it evaporates—since the oil droplets are emulsified and small, the corresponding voids are small (½ to 2 microns primarily) and contribute to the light scattering action and hence opacity of the product. Accordingly, while I have described the best embodiments known to me, one skilled in the art, with the foregoing information, may readily formulate useful compositions from other specific components without other than routine tests for applicability of the components.

While the specific importance of the composition and procedures described is of particular importance in providing printing paper for letterpress printing having a coated basis weight in the range of 25 to 35 pounds (25" x 38" x 500 sheets), coated both sides, it is clear that the emulsion coating composition may be employed for other printing purposes.

It will be understood that this invention is susceptible to modification in order to adapt to different usages and conditions and, accordingly, it is desired to comprehend such modifications within the invention as may fall within the scope of the appended claims.

What is claimed is:

1. A stable printing paper coating composition comprising a water phase, an oil phase dispsersed in the water phase, an essentially nongelling, cooked starch constituting the essential binder constituent of the composition and a paper coating pigment dispersed in the water phase, the oil of the oil phase having a lower vapor pressure than water and being in the form of small droplets of a size such that volatilization of the oil provides cells by which visible light is scattered, and an emulsifying agent having a molecular structure which includes a hydrophobic portion, a hydrophilic portion, and a branch chain of lesser length than the hydrophobic portion serving as a blocking group to inhibit the formation the formation of a channel complex between the starch and emulsifying agent and whereby the binding strength of the starch is preserved.

2. A stable printing paper coating composition suitable for letterpress printing comprising a water phase, an oil phase dispersed in the water phase an essentially nongelling, cooked modified starch constituting the essential binder constituent of the composition and a paper coating pigment dispersed in the water phase, the oil of the phase having a lower vapor pressure than water and being in the form of small droplets of a size that volatilization of the oil provides cells by which visible light is scattered, and an emulsifying agent having a molecular structure which includes a hydrophobic portion, a hydrophilic portion, and a branch chain of lesser length than the hydrophobic portion serving as a blocking group to inhibit the formation of a channel complex between the starch and emulsifying agent and whereby the binding strength of the modified starch is preserved, said coating composition having: a solids content in the range of about 25–40%; a viscosity in the range of about 5,000 to 18,000 centipoises, a paper coating pigment to modified starch ratio by weight of between about 1.25:1 to 1:4, and a modified starch to oil ratio by weight of between about 1:14 to 1:2.25.

3. A stable printing paper coating composition according to claim 2 and wherein said composition includes protein to the extent of not more than 10% by weight of the sum of the starch and protein weights.

4. A stable printing paper coating composition according to claim 2 wherein said emulsifying agent has the general formula $$R_1-N-R_3-COOM$$
$$|$$
$$R_2$$

wherein: the —COOM group is an ionizable hydrophilic group; $R_3$ is an alkyl or aryl group to 2 to 6 carbon atoms; $R_1$ is a substituent selected from the group consisting of (a) an alkyl radical of about 10 to 18 carbon atoms, (b) an aliphatic radical of a similar number of atoms and which is attached to an aryl which is attached to the N atom, or (c) an alkyl substituent of 10 to 18 carbon atoms which is attached to the N atom and which N atom forms part of a heterocyclic ring system, $R_2$ is an alkyl or substituted alkyl of less than 6 carbon atoms; and N is a nitrogen atom.

5. A stable printing paper coating composition as claimed in claim 4 and in which the emulsifying agent is selected from the group consisting of: disodium N-lauryl β-iminodipropionate; lauryl ethyl cycloimidinium, 1-hydroxy, 3-ethyl sodium alcholate, 2-methyl sodium carboxylate and disodium N-tallow β-iminodipropionate.

6. A printing paper coating composition according to claim 2 in which droplets of oil of the oil phase have a particle size in the range of about ½ to 2 microns.

7. Process of coating paper in the form of a web which comprises applying to the web an aqueous emulsion containing an essentially nongelling modified starch constituting the essential binder constituent of the composition and paper coating pigment in the continuous aqueous phase, an oil of lower vapor pressure than water in the disperse phase and an emulsifying agent having a molecular structure which includes a blocking group to inhibit the formation of a complex between the emulsifying agent and the starch, drying the coated web at a temperature of between about 200° F. and 350° F. to first principally eliminate water and, secondly, the oil of lower vapor pressure to produce a coating containing minute light dispersing cells and having a relatively dull surface, and subsequently finishing the paper by supercalendering while the coated web contains between about 1 to 5% by weight of moisture and supercalendering without sustantial collapsing of the cells to thereby attain a glossy light reflecting surface.

8. The process of coating paper according to claim 6 wherein the aqueous emulsion is alkaline, has a viscosity in the range of about 5,000 to 18,000 centipoises and a solids content of between about 25–40% by weight, the paper coating pigment being present to the extent of 0.25 to 1.25 parts by weight and the oil being present to the extent of between about 2.25 to 1.4 parts by weight for each part of essentially nongelling modified starch, the step of drying the web coated with the said emulsion being carried out by directing an air blast at a temperature of between about 260° F. and 350° F. to the web to first principally eliminate water and, secondly, the oil of lower vapor pressure.

References Cited

UNITED STATES PATENTS

| | | | |
|---|---|---|---|
| 2,053,343 | 11/1936 | Hadfield | 117—156 |
| 2,759,847 | 8/1956 | Frost et al. | 117—156 XR |
| 2,961,334 | 11/1960 | Clancy et al. | 117—36.7 |
| 3,108,099 | 10/1963 | Clancy et al. | 117—155 |

MURRAY KATZ, *Primary Examiner.*